United States Patent Office 2,796,416
Patented June 18, 1957

2,796,416
PROCESS OF PREPARING MALTOBIONO-LACTONE

Horace S. Isbell, Washington, D. C., and Robert Schaffer, Silver Spring, Md., assignors to the United States of America as represented by the Secretary of Commerce No Drawing. Application May 17, 1955, Serial No. 509,125

5 Claims. (Cl. 260—210)

This invention relates to the production and purification of maltobiono-lactone by a process of crystallization.

Most aldonic acids in solution establish equilibrium states with the corresponding lactone. The systems are complex and vary greatly from acid to acid. According to the prior art, maltobionic acid has little tendency for lactone formation. (See J. Biol. Chem. 71, 471, 1927.) Maltobiono-lactone was unknown except as a transitory intermediate in a solution produced by oxidation of maltose with bromine water which subsequently decomposed. (See NBS Jour. of Research 8, 615, 1932.)

In recent years lactones or aldonic acids have found commercial applications indicating the desirability of producing a maltobiono-lactone.

The object of the present invention is to provide a new compound crystalline maltobiono-lactone and a process for its preparation.

A further object of the invention is to provide maltobiono-lactone labeled with an isotope of carbon as a step in the synthesis of isotopically labeled maltose.

Other objects and advantages will be apparent or will appear hereinafter.

In applicant's copending application, Serial No. 503,037 filed on April 21, 1955, a new crystalline lithium maltobionate salt and a process for making the same is disclosed. The present invention contemplates the reduction of such acid salt to a sugar maltose.

According to the present invention maltobiono-lactone is obtained as a pure substance by the process of crystallization from solution. The solution of maltobiono-lactone can be prepared by any desired method and the conditions of crystallization can be varied widely. If maltobionic acid is used as a starting material for production of the lactone, a condition must be maintained so that little or no hydrolysis of the glucoside linkage takes place. Cleavage of the glucoside linkage is avoided by rapid removal of water, use of relatively low temperatures and through the use of solvents from which the lactone crystallizes readily. Crystallization of the lactone from the acid-lactone mixture leads to conversion of the acid to the lactone to maintain equilibrium conditions.

The invention will be made clear by reference to the following illustrative examples which show how the invention may be carried out. The invention, however, is not restricted to such illustrative embodiments.

Example 1

A cold aqueous solution of 10 g. lithium maltobionate is converted to maltobionic acid by passage through a column containing a cation exchange resin (Rohm and Haas Amberlite 1R120). The effluent is lyophillized. The dry product is dissolved in 10 ml. of mono-methyl ether of ethylene glycol (methyl Cellosolve). The solution is heated to 70° C. for 15 minutes, cooled to room temperature and nucleated. In the absence of seed crystals, crystallization may take several weeks; crystallization is readily initiated, however, by seeding with a few crystals of maltobiono-lactone obtained from a previous run. The process of crystallization is allowed to proceed with slow evaporation of the solvent until substantially all of the maltobionic acid is converted to maltobiono-lactone. The crude lactone is recrystallized by dissolving it in 25 parts methyl Cellosolve with warming. The solution is clarified by use of decolorizing carbon and filtration. The clear solution is concentrated under reduced pressure and preferably in the presence of seed crystals of maltobiono-lactone obtained from a previous run. The crystals that form are separated by filtration and washed with methyl Cellosolve. The product thus obtained corresponds to the formula $C_{12}H_{21}O_{11}$. The melting point is 193–195° C. and $[\alpha]_D^{20} = +123°$ five minutes after dissolution in water.

Seed crystals of maltobiono-lactone can also be obtained in a like manner by the addition of n-butyl alcohol to a methyl Cellosolve solution of lyophillized maltobionic acid followed by slow evaporation of the solvent with occasional stirring of mixture with a glass rod.

Example 2

After an initial quantity of maltobiono-lactone has been crystallized as above described, large quantities of maltobiono-lactone can be prepared cheaply from calcium maltobionate obtained by the method of Isbell and Frush (NBS Journal of Research 6, 1145, 1931). The calcium salt is converted to maltobionic acid by treatment with an equivalent quantity of sulfuric acid. After dehydration and dissolution of the dry product in methyl Cellosolve crystalline maltobiono-lactone is obtained.

In all cases, to avoid cleavage of the glycosidic linkage, excess mineral acid must be avoided. If desired, spray drying or other means of dehydration can be used in place of lyophillization to remove the water from the solution of maltobionic acid.

Example 3

One millimole lithium maltobionate-1-$C^{14}$ prepared by the method of our copending patent application No. 503,037, is dissolved in water and converted to maltobionic acid-1-$C^{14}$ by use of a cation exchange resin. The solution of maltobionic acid-1-$C^{14}$ is lyophillized. The lyophillized material is transferred to a tube by use of 5 ml. of methyl Cellosolve. The solution may be seeded as before. By a process of crystallization conducted in a desiccator over $CaCl_2$ with evaporation of the solvent all of the maltobionic acid is converted to crystalline maltobiono-lactone-1-$C^{14}$ in the course of several days.

The material can be recrystallized by the method given in Example 1, or it can be used directly for the production of maltose-1-$C^{14}$. Reduction of maltobiono-lactone-1-$C^{14}$ by sodium amalgam in the presence of sodium acid oxalate by the process of U. S. Patent 2,632,005 gives maltose-1-$C^{14}$ in yields up to 95 percent.

What is claimed is:

1. The process for the production of maltobiono-lactone which consists of the dehydration of aqueous maltobionic acid followed by separation of crystalline maltobiono-lactone.

2. The process for the production of maltobiono-lactone which consists of the dehydration of an aqueous solution of maltobionic acid, dissolution of the dry material in methyl Cellosolve and separation of crystalline maltobiono-lactone from the solution.

3. The process of making crystalline maltobiono-lactone having the formula $C_{12}H_{20}O_{11}$ comprising the steps of converting an aqueous solution of lithium maltobionate to maltobionic acid by subjection to a cation exchange resin, lyophillizing the resulting effluent dissolving the lyophillized material in a solvent selected from the group consisting of a mono-methyl ether of ethylene glycol and crystallizing out maltobiono-lactone.

4. The invention as defined in claim 3 in which the crystalline maltobiono-lactone is redissolved in a solvent consisting of a mono-methyl ether of ethylene glyocol, purified by filtering the solution in the presence of decolorizing carbon, concentrating the filtered solution by evaporation and crystallizing out purified maltobiono-lactone.

5. The process of making maltobiono-lactone-1-$C^{14}$ which consists of converting an aqueous solution of lithium maltobionate-1-$C^{14}$ to maltobionic acid-1-$C^{14}$ by subjection to a cation exchange resin, lyophillizing the resulting effluent, dissolving the lyophillized material in a solvent consisting of a mono-methyl ether of ethylene glycol and crystallizing out maltobiono-lactone.

References Cited in the file of this patent

Levene et al.: J. Biol. Chem., vol. 71, pages 471–475 (1927).

Isbell: N. B. S. Jour. of Research, vol. 8, pages 615–624 (1932).

Pigman et al.: Chemistry of the Carbohydrates, pages 292–295. (Copyright 1948.)